(12) United States Patent
Schmidt

(10) Patent No.: US 11,967,090 B2
(45) Date of Patent: Apr. 23, 2024

(54) METHOD OF AND MICROSCOPE COMPRISING A DEVICE FOR DETECTING MOVEMENTS OF A SAMPLE WITH RESPECT TO AN OBJECTIVE

(71) Applicant: Abberior Instruments GmbH, Göttingen (DE)

(72) Inventor: Roman Schmidt, Göttingen (DE)

(73) Assignee: Abberior Instruments GmbH, Göttingen (DE)

(*) Notice: Subject to any disclaimer, the term of this patent is extended or adjusted under 35 U.S.C. 154(b) by 29 days.

(21) Appl. No.: 17/500,030

(22) Filed: Oct. 13, 2021

(65) Prior Publication Data

US 2022/0114738 A1    Apr. 14, 2022

(30) Foreign Application Priority Data

Oct. 14, 2020  (DE) .................... 10 2020 127 071.2

(51) Int. Cl.
*G02B 21/26* (2006.01)
*G06T 7/246* (2017.01)

(52) U.S. Cl.
CPC .............. *G06T 7/248* (2017.01); *G02B 21/26* (2013.01); *G06T 2207/10056* (2013.01)

(58) Field of Classification Search
USPC ........................................................... 348/79
See application file for complete search history.

(56) References Cited

U.S. PATENT DOCUMENTS

| 9,068,944 | B2  | 6/2015  | Tanabe |              |
|-----------|-----|---------|--------|--------------|
| 2002/0090127 | A1* | 7/2002  | Wetzel | G06V 20/693 |
|           |     |         |        | 382/282      |
| 2004/0017579 | A1* | 1/2004  | Lim    | H04N 1/56    |
|           |     |         |        | 358/448      |
| 2014/0024020 | A1  | 1/2014  | Tanabe |              |
| 2016/0328827 | A1* | 11/2016 | Ilic   | G06T 3/4038  |

(Continued)

FOREIGN PATENT DOCUMENTS

| CN | 111 289 775 A    | 6/2020 |
| DE | 102014113256 A1  | 3/2016 |

(Continued)

OTHER PUBLICATIONS

EP Search Report dated Mar. 25, 2022.

(Continued)

*Primary Examiner* — Mikhail Itskovich
(74) *Attorney, Agent, or Firm* — The Sladkus Law Group

(57) ABSTRACT

For detecting movements of a sample with respect to an objective, the sample is imaged onto an image sensor comprising an array of pixels by means of the objective. Images of the sample are recorded in that light coming from the sample is registered at the pixels. Variations of intensities of the light coming from the sample and registered at the pixels are determined during a set-up period in that a temporal course of the intensity of the light, which has been registered at a respective one of the pixels over the set-up period, is analyzed. Using these variations as a criterion, a subset of not more than 90% of the pixels of the image sensor is selected. Parts of the images that each correspond to the selected subset are compared to parts of at least one reference image that also correspond to the subset.

24 Claims, 12 Drawing Sheets

(56) References Cited

U.S. PATENT DOCUMENTS

2019/0302440 A1 10/2019 Stoppe et al.
2020/0265570 A1 8/2020 Stoppe

FOREIGN PATENT DOCUMENTS

| DE | 102017125799 A1 | 5/2019 |
| DE | 102018107356 A1 | 10/2019 |
| WO | 2018102147 A1 | 6/2018 |
| WO | 2019091570 A1 | 5/2019 |
| WO | 2020201430 A1 | 10/2020 |

OTHER PUBLICATIONS

"Supplementary Materials" to F. Balzarotti et al., "Nanometer resolution imaging and tracking of fluorescent molecules with minimal photon fluxes", Science, vol. 355, Issue 6325, pp. 606-612, 2017.
K. C. Gwosch et al., "Minflux nanoscopy delivers multicolor nanometer 3D-resolution in (living) cells", bioRxiv, doi: http://dx.doi.org/10.1101/734251, 2019, in "Materials and Methods".

* cited by examiner

METHOD OF AND MICROSCOPE COMPRISING A DEVICE FOR DETECTING MOVEMENTS OF A SAMPLE WITH RESPECT TO AN OBJECTIVE

CROSS REFERENCE TO RELATED APPLICATIONS

This application claims priority to German Patent Application No. DE 10 2020 127 071.2 filed Oct. 14, 2020.

FIELD OF THE INVENTION

The present invention relates to a method of detecting movements of a sample with respect to an objective.

Further, the invention relates to a microscope comprising an objective and a device for detecting movements of a sample with respect to the objective.

Movements of a sample with respect to an objective of the microscope by means of which the sample is examined have a significant effect. This especially applies in super-resolution microscopy in which spatial resolutions beyond the diffraction barrier are achieved, and even if the movements do not exceed the nanometer range. Any movement of the sample with respect to the objective, which takes place between two points in time, shifts the relative positions of objects in the sample which have been determined at these two points in time. If movements of the sample with respect to the objective are not detected, they cannot be compensated, and the effective spatial resolution in microscopically imaging a structure of interest is determined by the extent of these movements.

Particularly over longer measurement periods, movements of a sample with respect to the objective of a microscope may never be avoided completely, and limiting these movements to small values also incurs considerably technological effort. Thus, there is an interest in detecting these movements to be able to consider and, particularly, to compensate them.

BACKGROUND OF THE INVENTION

For detecting movements of a sample with respect to an objective, it is known from international patent application publication WO 2020/201 430 A1 to image light from at least one reference object connected to the sample at consecutive points in time by means of the objective into images in an image plane. The images in the image plane are recorded by a camera which is used as an image sensor, and they are compared to reference images. Low spatial frequencies are masked out of the images in a plane that is Fourier-conjugated to the image plane in front of the camera. For this purpose, parts of the light, which originate from a central area of a pupil of the objective, are masked out in the plane that is Fourier-conjugated to the image plane. The reference objects shall have edges over which the intensity of the light originating from the reference objects drops by at least 90% and whose width in parallel to the image plane is smaller than the wavelength of the light. The reference objects may be point shaped markers or beads having a diameter below the wavelength of the light. The reference objects may also be suitable structures of the actual sample. A lateral movement of the sample with respect to the objective, that is orthogonal to an optical axis of the objective, is gathered from shifts of object images of the reference objects between the images. On the other hand, an axial movement of the sample with respect to the objective, that is oriented along the optical axis, is gathered from deformations of the object images of the reference objects and particularly from similarities of object images of the reference objects in the images with object images of the reference objects in the reference images. It does not appear from WO 2020/201 430 A1 how the object images of the reference objects, especially of suitable structures of the sample itself, may be found in or even be automatically selected from the images.

From the "Supplementary Materials" to F. Balzarotti et al., "Nanometer resolution imaging and tracking of fluorescent molecules with minimal photon fluxes", Science, Vol. 355, Issue 6325, pages 606-612, 2017, it is known to detect the axial position of a sample with respect to an objective by means of the movement of the beam image of a reference beam irradiated at an angle and totally reflected at a cover slip boundary surface in an image of the cover slip recorded with a camera. A lateral sample position with respect to the objective is detected by imaging a dark field image of scattering nanorods in the sample onto a further camera. Two-dimensional Gaussian functions are fitted to the nanorod images of the nanorods, and the center of the respective function is used as a measure of the lateral position of the respective nanorod. In this document it is also not described how the nanorod images of the nanorods can be found in or even be automatically selected from the dark field images.

K. C. Gwosch et al., "M INFLUX nanoscopy delivers multicolor nanometer 3D-resolution in (living) cells", bioRxiv, doi: http://dx.doi.org/10.1101/734251, 2019, in "Materials and Methods", disclose an active stabilization system for position stabilization of a sample with respect to an objective. For lateral stabilization, scattering gold nanorods are imaged onto a camera. The axial position is detected by illuminating the sample with an infrared laser beam totally reflected at the sample. Once again, there is no indication how the nanorod images of the individual gold nanorods may be automatically found in the images of the camera or even be automatically selected therefrom.

A method of operating a microscope and a control unit for a microscope for realizing an autofocus with angle-variable illumination are known from German patent application publication DE 10 2018 107 356 A1 and US patent application publication US 2019/0 302 440 A1 belonging to the same patent family. At least one image is captured in a multiplicity of angle-variable illumination geometries. A separation of an object image of a measurement object from disturbing structures in the at least one image is carried out on the basis of control data indicative of a priori knowledge. After the separation, components in the at least one image that change in relation to a change in the angle-variable illumination geometry are recognized as an object shift of the measurements object. Based on the object shift, a defocus position of the measurement object is determined and then compensated by adjusting a z-position of a sample stage of the microscope. The disturbing structures may, for example, be light reflections, shades, effects due to impurities, for example in the area of the sample stage, but also in static regions of an imaging optic of the microscope, and sensor noise of the detector. For identifying the disturbing structures, the measurement object may be moved in z-direction. Spatially fixed disturbing structures which are not connected to the sample stage are then spatially fixed and can be acknowledged by calculating differences. Generally, reference-measurements will be used, in which an image without measurement object or variable measurement objects are captured, for example, in a calibration phase prior to the actual measurement. Then, in a corresponding reference image, the disturbing structures which are caused by the imaging optic of the optical system are detected. In another implementation, the contrast is considered in combination with a signal to noise ratio. For this purpose, a pair-wise correlation between images of a plurality of images is calculated, and a correlation maximum is detected in each correlation. Then, it is requested that the correlation maximum does not go below or exceed a predetermined limit value. The limit value may, for example, be determined based on the contrast of the disturbing structures. For low contrast measurement objects, those correlation maxima with particularly high values may be discarded.

An apparatus for taking images and a method of taking images with reflection suppression are known from German patent application publication DE 10 2014 113 256 A1. An object is illuminated under a plurality of illumination geometries. A detector registers a plurality of images of the object for the plurality of illumination geometries. An electronic evaluation device applies a shadowing operation for reflection suppression to at least a part of the plurality of the images. The shadowing operation for reflection suppression depends on the illumination geometry utilized in recording the respective image. The modified images generated by the shadowing operation are combined into a resulting image.

A method of reducing image artifacts in images is known from German patent application publication DE 10 2017 125 799 A1 and US patent application publication US 2020/0 265 570 A1 belonging to the same patent family. Images are captured at different arrangements of a sample object to an illumination and a detector. Then, based on a comparison of pixel values of pixels of the images, an pixel-wise combination of the images takes place. In this way, an artifact reduction is achieved, i.e. reflections and/or shading-in can be reduced.

A method of digitizing microscopic images of a biological tissue is known from US 2002/0 090 127 A1. At first, an image is converted into a greyscale image. Then, an average value and the standard deviation of the local pixel intensities are analyzed. The average pixel intensities are used to differentiate between regions containing tissue and empty regions and other non-tissue regions of the image. The standard deviations are a good indication of the limit between tissue and empty image. The average and the standard deviations are combined to generate a limit value which is used to carry out a preliminary classification of tissue with respect to non-tissue. Afterwards, morphological filters can be applied to refine the classification based on the size and the position of neighboring groups of potential tissue pixels.

From U.S. Pat. No. 9,068,944 it is known to reduce the size of light intensity data in a scanning molecule counting method that is implemented using a confocal or multiphoton microscope. A time series of a light intensity of light from a detection area which is moved with respect to the sample is analyzed to detect the signal of a light emitting particle in the time series. Areas in which there is no signal that indicating light from light emitting particles are removed from the light intensity data of the light intensity time series.

There still is a need of a method of and a microscope comprising a device for detecting movements of a sample with respect to an objective, in which the movements of the sample with respect to the objective can be detected automatically, particularly without manual selection of object images of reference objects of the sample.

SUMMARY OF THE INVENTION

The present invention relates to a method of detecting movements of a sample with respect to an objective. The method comprises the step of imaging the sample onto an image sensor which comprises an array of pixels by means of the objective; the step of recording images of the sample by the image sensor in that light coming from the sample is registered at the pixels of the image sensor; and the step of determining variations of intensities of the light coming from the sample and registered at the pixels of the image sensor during a set-up period in that a temporal course of the intensity of the light, which has been registered at a respective one of the pixels of the image sensor over the set-up period, is analyzed. The method further comprises the step of selecting a subset of not more than 90% of the pixels of the image sensor using the variations as a criterion; and the step of comparing parts of the images that each correspond to the selected subset of the pixels of the image sensor to parts of at least one reference image that also correspond to the subset of the pixels of the image sensor.

The present invention also relates to a microscope comprising an objective, a sample holder for positioning a sample relative to the objective, and a device for detecting movements of the sample with respect to the objective. The device comprises an image sensor including an array of pixels, onto which the sample is imaged by means of the objective, the image sensor being configured for recording images of the sample in that light coming from the sample is registered at the pixels of the image sensor, and a selection module configured to determine variations of intensities of light coming from the sample and registered at the individual pixels of the image sensor during a set-up period in that a temporal course of the intensity of the light registered at the respective pixel of the image sensor over the set-up period is analyzed, and to use the variations as a criterion in selecting a subset of not more than 90% of the pixels of the image sensor. The device further comprises a comparison module configured to compare parts of the images which each correspond to the subset of the pixels of the image sensor with parts of at least one reference image which also correspond to the subset of the pixels of the image sensor.

Other features and advantages of the present invention will become apparent to those skilled in the art upon consideration of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
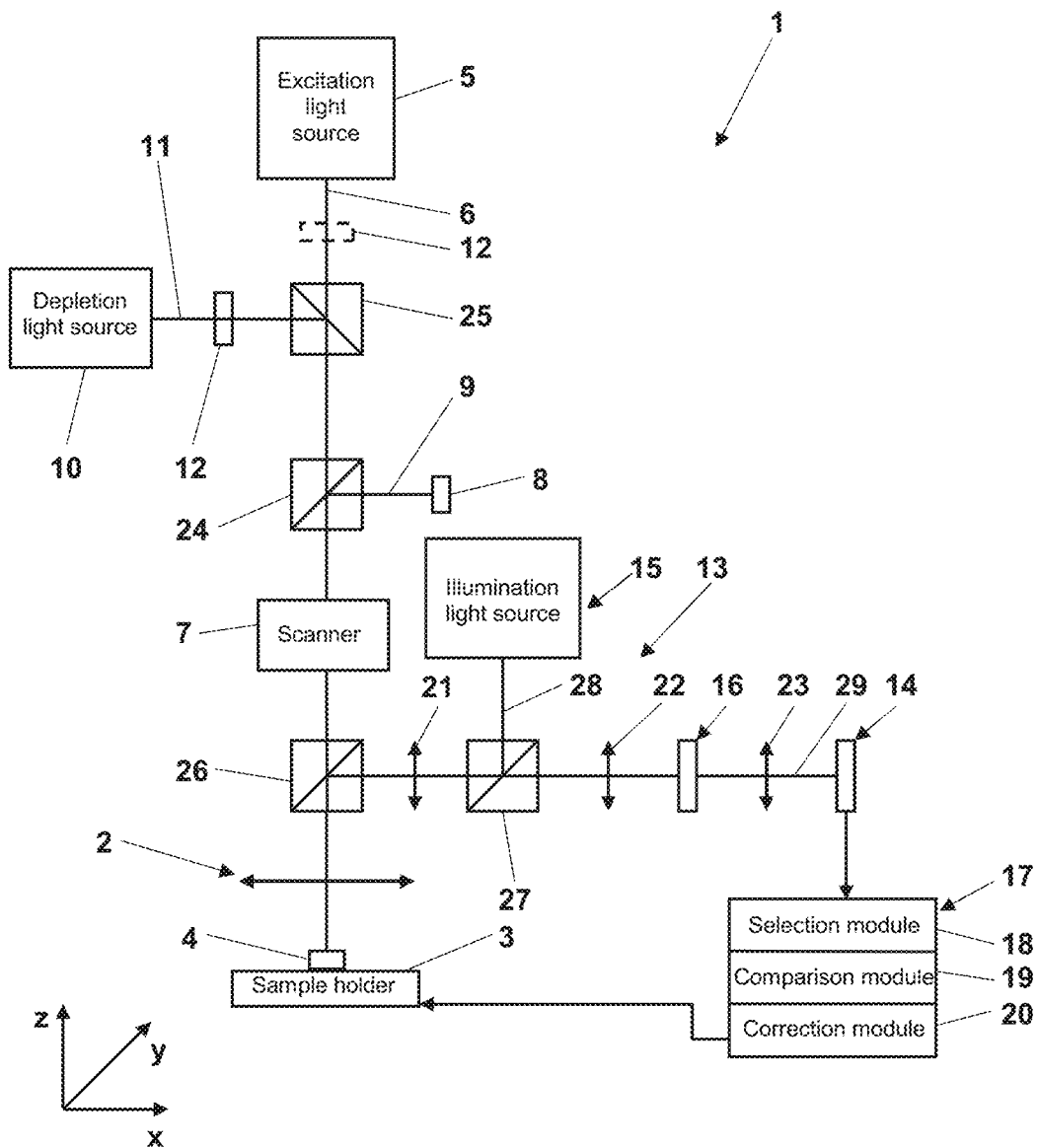
FIG. 1 is a schematic depiction of a microscope of the present disclosure.

In a method of detecting movements of a sample with respect to an objective according to the present disclosure, the sample is imaged onto an image sensor by means of the objective. Images of the sample are recorded by the image sensor in that light coming from the sample is registered at pixels of the image sensor. A subset of not more than 90% of the pixels of the image sensor is selected. For this purpose, variations of intensities of the light coming from the sample and registered at the individual pixels of the image sensor during a set-up period are determined, and the variations are used as a criterion in selecting the subset of the pixels of the image sensor. Afterwards, the parts of the images, which each correspond to the selected subset of the pixels of the image sensor are compared to a part of at least one reference image which also corresponds to the selected subset of the pixels of the image sensor. The reference images may be previously recorded images of the sample in which the sample has been in a known relative position with respect to the objective.

Despite the determination of the variations and the use of the variations as a criterion in selecting the subsets of the pixels of the image sensor, the method according to the present disclosure may correspond to the method known from WO 2020/201 430 A1 or the methods for detecting lateral movements of a sample with respect to an objective known from F. Balzarotti et al. and K. C. Gwosch et al.

For selecting the object images of suitable reference objects of the samples in the recorded pictures of the sample, the variations of light intensities of the light coming from the sample and registered by the image sensor, which result at the individual pixels of the image sensor during a set-up period, are determined. Thus, the temporal course of the intensity of the light registered at the individual pixels of the image sensor is analyzed over the set-up period. For this purpose, the intensity of the light or of a signal of the image sensor belonging to the respective pixel of the image sensor may be sampled at a suitable sample rate, or the intensity or the signal of the image sensor is integrated over consecutive short intervals. The sample rate or the intervals are to be selected such that typically between 7 and 100 single values are available as a base for determining each variation at each pixel of the image sensor.

Actually, the variation for the respective pixel of the image sensor may be determined as a standard deviation of these single values from the average value of the single values. In other words, the variations may be determined as standard deviations of the intensities from an average intensity of the light registered at the respective pixel of the image sensor. A determination of the variation as a variance of the intensities of the light registered at the respective pixel of the image sensor is also possible and generally of equal value, because the variance and the standard deviation are in a fixed relation. The variances are the squares of the standard deviations. Considering this fact, all the following explanations with regard to standard deviations are transferable to variances of the intensities.

Considerable parts of the variations of the light intensities determined in this way are caused by a background noise at the pixels of the image sensor and statistically, particularly if only few photons of the light coming from the sample are the basis of the determination of the respective variation. Thus, it is generally suitable to correct the variations for a variation background value which is linearly dependent on a square root of an average intensity of the light registered at the respective pixel of the image sensor, and with regard to the background noise, as long as the background noise at the pixels of the image sensor does not remain so small as compared to the variation background value that it may simply be neglected. The correction for the background noise may be made by subtracting a constant background noise value. The correction for the variation background value may be made in that the variation background value at the respective pixel is subtracted from each variation. Alternatively, the variations may be normalized in that each variation is divided by the variation background value at the respective pixel.

The pixels of the image sensor of the highest variations, particularly the highest corrected variations, are of high importance in selecting the pixels of the image sensor which correspond to suitable reference objects of the sample for detecting movements of the sample with respect to the objective. Depending on the conditions during the set-up period, the height of the variations is to be considered as a positive or negative criterion in selecting the pixels of the subset.

If the sample is set in motion with respect to the objective in the set-up period, the resulting variations are a suitable positive criterion in selecting the subset of the pixels of the image sensor. The variations then point to object images of reference objects which, due to the motion of the sample with respect to the object, move in an easily determinable way so that the motion can be tracked by means of easily determinable changes of the images. On the other hand, pixels at which, despite the motion of the sample with respect to the objective, no remarkable variations occur are without information content for tracking these movements.

In an embodiment, the sample may be set in a first motion with respect to the objective in a first partial period of the set-up period. Variations resulting from the first motion over the first partial period can be determined and afterwards be used as a positive criterion in selecting the subset of the pixels of the image sensor. The selection may be implemented in that the first variations or the corrected first variations exceed a first variation limit value at all pixels of the subset or at least within a predetermined maximum first distance to all pixels of the subset.

In a more particular embodiment, a first pre-selection for the subset of the pixels may be made in that all pixels are selected in which the first variations or the corrected first variations exceed the first variation limit value, and in that all pixels are added which are located within the predetermined maximum first distance to the pixels at which the first variations or the corrected first variations exceed the first variation limit value.

If here, in the following parts of the description or in the claims, reference is made to any pixels that are located within a predetermined maximum distance to certain other pixels, this means that these pixels are not farther away from the certain other pixels than that maximum distance.

In an embodiment of the method according to the present disclosure, the first motion only runs in a spatial direction orthogonal to an optical axis of the objective. However, in another embodiment of the method of the present disclosure, the first motion runs in two spatial directions orthogonal to the optical axis of the objective. In the first motion, the sample may, for example, be brought out of a central position one after the other into eight further positions arranged around this central position, particularly into positions of a square grid of raster points, wherein the intensity of the light coming from the sample is registered for each of these positions at each of the pixels of the image sensors. This motion may also be repeated. Thus, nine intensities or a multiple of nine intensities are registered at each pixels of the image sensor, and the variation of the intensities belonging to the respective pixel is determined from these intensities. In this way, pixels are selected that register object images of suitable reference objects for determining any lateral movements of the sample with respect to the objective.

If the first motion runs in a first direction or plane, in which the movements of the sample with respect to the objective are detected, the sample, during a second partial period of the set-up period, may be set in a second motion with respect to the objective, which runs in a second direction in which the movements of the sample with respect to the object are detected, and which runs normal to the first direction or plane. In an embodiment, the second direction may be the direction of the optical axis of the objective. If second variations over the second partial period resulting from the second movement are determined and used in selecting the subset of the pixels of the image sensor as a positive criterion, pixels are selected by means of this positive criterion, that correspond to object images of reference objects which are well suited for tracking axial movements of the sample with respect to the objective.

In an embodiment, the subset of the pixels of the image sensor may be selected here such that, at its pixels or within a predetermined maximum second distance to its pixels, the second variations or the corrected second variations exceed a second variation limit value.

In a more particular embodiment, a second pre-selection for the subset of the pixels may be made in that all pixels are selected at which the second variations or the corrected second variations exceed the second variation limit value and in that all pixels are added which are within the predetermined maximum second distance to the pixels at which the second variations or the corrected second variations exceed the second variation limit value. Afterwards, a unified pre-selection for the subset of the pixels may be made in that a union of the first pre-selection and the second pre-selection is determined, i.e. in that all pixels are selected which are included within at least one of these two pre-selections.

It is to be understood that, generally, even three pre-selections may be made and unified in that the sample, over each of three different partial periods, is only moved in one of the three spatial directions with respect to the objective, and the associated variations at the individual pixels are determined. Vice versa, only a single pre-selection for the subset may be based on a single two-dimensional lateral movement of the sample with respect to the objective, and it may be assumed that this pre-selection is also suitable for tracking an axial movement of the sample with respect to the objective.

The variations determined may also be used as a suitable negative criterion in selecting the subset of the pixels of the image sensor.

For example, it is possible to not move the sample with respect to the objective in a third partial period of the set-up period. Then, third variations occurring over the third period can be determined and used in selecting the subset of the pixels of the image sensor as a negative criterion. If variations of the intensities of the light registered at one of the pixels, even without movement of the sample with respect to the objective, significantly go beyond variation background values which are due to statistics, this may particularly have two causes, namely, on the one hand, movements of structures within the sample or, more general, parts of the sample inclusive of a sample slide or a cover slip, and, on the other hand, defective pixels of the image sensor. In a same way as defective pixels of the image sensor should not be used for detecting movements of the sample with respect to the objective, pixels should not be used which capture structure images of structures moving within the sample. Thus, the third variations are a comprehensible negative criterion for the selection of the subset of the pixels.

In an embodiment, the subset of the pixels of the image sensor may be selected based on this negative criterion such that, at its pixels or within a predetermined maximum third distance to its pixels, the third variations or the corrected third variations do not exceed a third variation limit value. In a more particular embodiment, a third pre-selection for the subset of the pixels may be made in that pixels are removed at which the third variation or the corrected third variation exceeds the third variation limit value and in that, further, all pixels are removed which are within the predetermined maximum third distance to the pixels at which the third variations or the corrected third variations exceed the third variation limit value. This third pre-selection may then be combined with the first pre-selection or, if a second pre-selection has also been made, be combined with its union with the first pre-selection in that an intersection of the third pre-selection and the first pre-selection or the union is determined.

In an alternative embodiment of applying the third variations as a negative criterion, an pixel weighting mask, whose transparency decreases with increasing third variation or corrected third variation at the respective pixel, is applied to the images and the at least one reference image. This image mask may then, if present, also be applied to the first pre-selection or the unified pre-selection of the pixels.

Besides pixels at which variations occur even without moving the sample with respect to the object, also such pixels may not be considered or may be removed in selecting the subset, which do not keep a fourth distance to a margin of the image sensor. This fourth distance, in a same way as the previously mentioned first and second distances, has the function of ensuring that the object images of suitable reference objects are covered by the selected subset, even if the associated reference objects move with respect to the objective together with the sample so that their images on the image sensor are moved. On the other hand, the previously mentioned third distance has the function to avoid that the structure images of structures moving within the sample get into the area of the selected subset. Suitable sizes of the distances depend on the conditions of the imaging of the sample onto the image sensor. Typically, the distances are in a range from 10 to 100 pixels, often in a range from 20 to 50 pixels.

Insofar as here and elsewhere ordinal numbers like "first", "second", "third" and "fourth" are used, these ordinal numbers only serve for differentiating the terms to which they are added. Thus, a third pre-selection for the subset of the pixel does not require that there is a first and/or second pre-selection of the subset of the pixels. Instead, only the pre-selection of the pixels may be made. Further, the third pre-selection may be made chronologically before any also made first and/or second pre-selection. Further, it is not required that the features provided with different ordinal numbers differ. Thus, the second variation limit value may differ from the first variation limit value, but it does not need to.

Further, with regard to the variation limit values, it may be remarked that they are suitably selected dependently on the totality of the variations or corrected variations compared thereto. Thus, the respective variation limit value may, for example, be set such that it is only exceeded by 10% or 5% or 1% of the variations or corrected variations at the individual pixels.

It has already been explained that the third variations which result without motion of the sample with respect to the objective, may be applied as a negative criterion for the selection of the subset by means of an pixel weighting mask. The selection of the subset of the pixels of the image sensor may even completely be implemented by means of an image mask which is applied to the images and the at least one reference image in comparing the parts of the images to the parts of the respective one reference image. Prior to applying this image mask implementing the selection of the subset in form of transparent regions, edges between the transparent regions and non-transparent regions of the image mask may be smoothened. Then, the influence of pixels in the area of the edges continuously decreases. Thus, it is avoided that high differences between the images and the reference images occur because some object images of objects in the sample, which have not been selected as reference objects, cross the edge of the image mask.

The subset of the pixels may fully automatically be selected by means of the method of the present disclosure, i.e. computer-implemented and without any contribution of a human user. The relative size of the subset of the pixels which are automatically selected depends on the predetermined distances and the criteria for selecting the variation limit values. Typically, it does not amount to more than 75%, often not to more than 50% and most times not to more than 25% of the pixels of the image sensor. A suitable selection of the subset many times includes at least 1% and often at least 5% and/or many times at least 20 and often at least 200 of the pixels of the image sensor.

A microscope according to the present disclosure comprises an objective, a sample holder for positioning a sample, and a device for detecting movements of the sample with respect to the objective. The device comprises an image sensor including an array of pixels, onto which the sample is imaged by means of the objective. The image sensor is configured to record images of the sample in that light coming from the sample is registered at the pixels of the image sensor. A selection module of the device is configured to select a subset of not more than 90% of the pixels of the image sensor. For this purpose, the selection module is configured to determine variations of intensities of the light coming from the sample and registered at the individual pixels of the image sensor during a set-up period, and to use the variations as a criterion in selecting the subset of the pixels of the image sensor. A comparison module of the device is configured to compare the parts of the images, which each correspond to the selected subsets of the pixels of the image sensor, to parts of at least one reference image, which also correspond to the selected subset of the pixels of the image sensor. Movements of the sample with respect to the objective detected as a result of this comparison may be used by a correction module to control the sample holder for compensation movements which compensate these movements. Thus, the sample is effectively kept at rest with respect to the objective.

Corresponding preferred embodiments of the microscope of the present disclosure result from the preceding explanations of preferred embodiments of the method of the present disclosure.

In an alternative method of detecting movements of a sample with respect to an objective of the present disclosure, the sample is imaged onto an image sensor by means of the objective; images of the sample are recorded by the image sensor in that light coming from the sample is registered at the pixels of the image sensor; a subset of not more than 90% of the pixels of the image sensor is selected in that, for a set-up period which is by at least 100%, preferably by at least 500%, even more preferably by at least 1,000% longer than a duration of exposure of the images and while the sample is not moved with respect to the objective, average intensities of the light coming from the sample and registered at the individual pixels of the image sensor are determined, in that variations of the average intensities over groups of 9 to 625 pixels which are neighboring each other are determined, and in that the variations or corrected variations which are corrected as above are used as a positive criterion in selecting the subset of the pixels of the image sensor. The parts of the images, which correspond to the selected subset of the pixels of the image sensor, are then compared to parts of at least one reference image, which also correspond to the selected subset of the pixels of the image sensor. Actually, the average intensities over the groups of pixels which are neighboring each other may each be assigned to a central pixel of the respective group and then be used like in making the first pre-selection in the method of the present disclosure. Further, all embodiments of the previously described method of the present disclosure which fit thereto are preferred embodiments of the alternative method of the present disclosure.

The alternative method locates areas of the images with strong spatial variations of the intensities of the light coming from the sample which are not levelled by movements of structures in the sample. However, the alternative method does not recognize if these strong variations are due to optical artifacts or errors of pixels of the image sensor.

Referring now in greater detail to the drawings, the microscope 1 depicted in FIG. 1 comprises an objective 2 and a sample holder 3 having actuating elements for positioning a sample 4 with respect to the objective 2, which are not depicted here in further detail. By means of the sample holder 3, the sample 4 can be positioned with respect to the objective 2 laterally, i.e. in x- and y-direction, and axially in direction of an optical axis of the objective, i.e. in z-direction. For imaging structures of interest of a sample by means of laser scanning fluorescence light microscopy, the microscope 1 has an excitation light source 5 for excitation light 6, a scanner 7 and a detector 8 for fluorescence light 9 coming from the sample 4. Further, a depletion light source 10 for depletion light 11, for example STED-light, is provided to increase the spatial resolution of the laser scanning fluorescence light microscopy. Here, a light distribution of the depletion light 11 in the sample 4 is formed by means of a wave front modulator 12 such that it comprises a central intensity minimum. Instead of STED-microscopy, the microscope 1 may, for example, also be configured for MINFLUX-microscopy. For this purpose, a light intensity distribution of the excitation light 6 may be formed by an optional further wave front modulator 12 such that it has a central intensity minimum. However, the microscope 1 does not need at all to be a laser scanning microscope but it may also be a localization microscope. In any case, a device 13 for detecting movements of the sample 4 with respect to the objective 2 is present. The device 13 includes an image sensor 14 comprising an array of pixels. The image sensor 14 is configured for recording images of the sample in that light 29 coming from the sample is registered at the pixels of the image sensor 14. This light 29 is generated by means of an illumination light source 15 for illumination light 28 by which the sample 4 is illuminated with incident light, here. In imaging the sample 4 onto the image sensor 14, a stop 16 is arranged in a Fourier plane with respect to the image plane, the stop masking out a central area of the Fourier-plane and, correspondingly, low spatial frequencies from the images recorded by the image sensor 14. The images recorded by the image sensor 14 are processed in a processing unit 17 of the device 13. The processing unit 17 includes a selection module 18 for selecting a subset of pixels of the image sensor which are then used in a comparison module 19 as a basis for a comparison of the images to reference images. Movements of the sample 4 with respect to the objective 2 detected on basis of this comparison are compensated by means of a correction module by controlling the sample holder 3. The device 13 may completely correspond to that what is known from WO 2020/201 430 A1 which is completely incorporated herein by reference. The imaging system for imaging the sample 4 on the image sensor 14 may also be taken from there. Thus, the positions of lenses 21-23 in the beam path between the objective 2 and the image sensor 14 is not explained in further detail here. The arrangement of beam splitters 24-27 for separating or combining the individual beam paths in FIG. 1 is self-explanatory.

Figure 2:
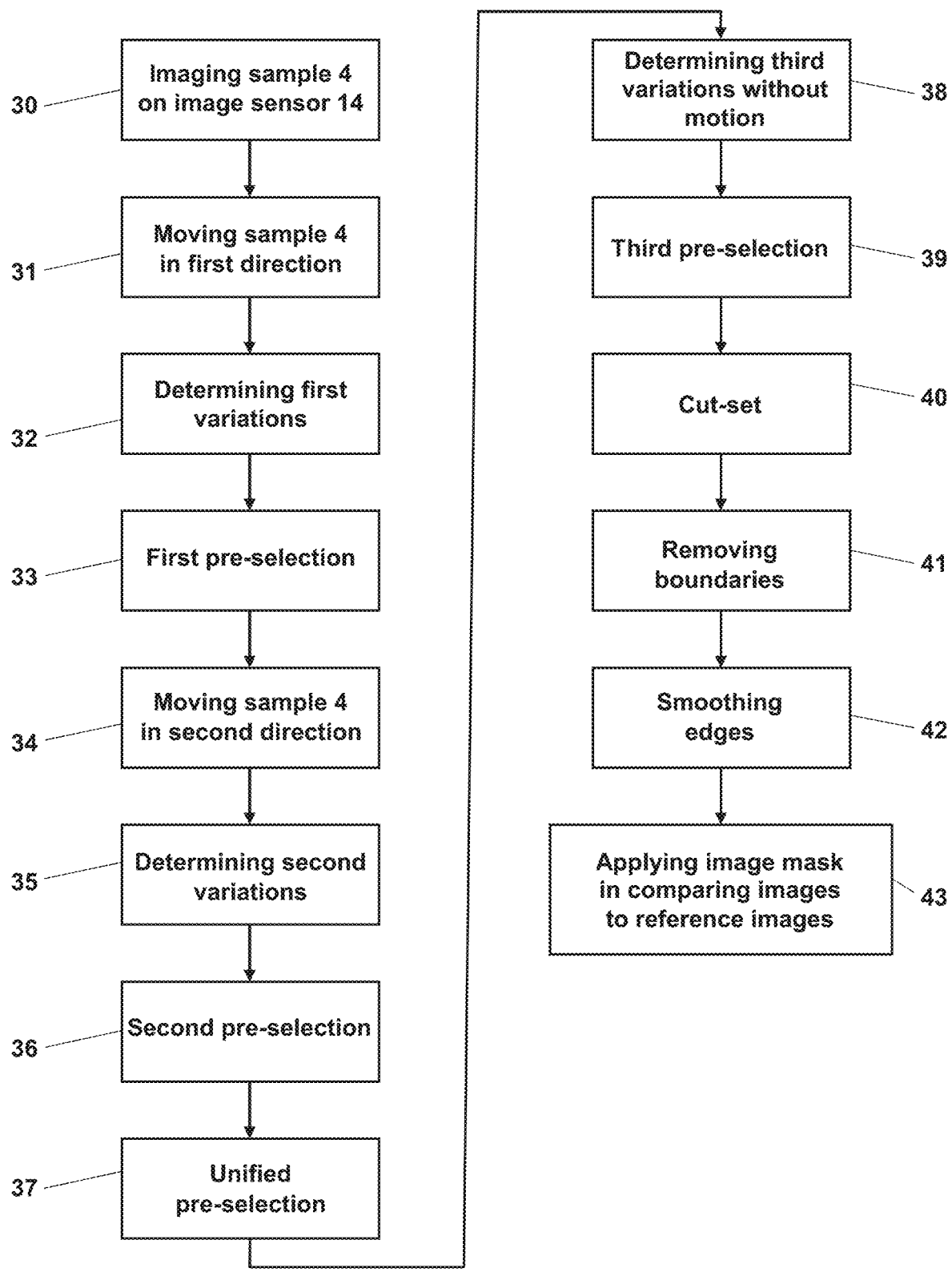
FIG. 2 is a flowchart of an embodiment of the method of the present disclosure.

An embodiment of the method of the present disclosure is depicted in FIG. 2 as a flowchart. A first step 30, the imaging of the sample 4 onto the image sensor 14, is realized by the optical setup of the microscope 1 according to FIG. 1. The following steps 31 to 42 are executed by the selection module 18. In step 31, in a first partial period of a set-up period, the sample 4 is moved in a first direction with respect to the objective 2. In step 32, first variations of the intensities of the light 29 coming from the sample 4, which occur at the individual pixels, are determined. In step 33, a first pre-selection for the subset of the pixels to be considered by the comparison module 19 is made using the first variations or first variations corrected for purely statistical influences as a positive criterion. Then, in step 34, the sample is moved in a second direction. In step 35, the resulting second variations of the light intensities of the light 19 from the sample at the individual pixels of the image sensor 14 are determined. In step 36, a second pre-selection for the subset of the first pixels is made using the second variations or second variations corrections for purely statistical influences as a positive criterion. In step 37, the first pre-selection from step 33 and the second pre-selection from step 36 are combined in a unified pre-selection in that a union is determined. In step 38, the determination of third variations takes place in a third partial period of the set-up period without movements of the sample 4 with respect to the objective 2. In step 39, a third pre-selection for the subset is made on basis of these third variations or on basis of third variations corrected for statistical influences used as a negative criterion. Then, in step 40, an intersection between the unified pre-selection from step 37 and the third pre-selection from step 39 is determined. In step 41, the pixels at the margins of the image sensor 14 are removed from this intersection. Afterwards, in step 42, edges between the areas of selected and non-selected pixels are smoothened. An image mask resulting therefrom, in which the regions of selected pixels are transparent and the regions of non-selected pixels are non-transparent, is applied by the comparison module 19 in a step 43 in comparing the images with reference images. This comparison may particularly be made on basis of the determination of relations between the respective image and a reference image. Details concerning this aspect may be taken from WO 2020/201 430 A1.

Figure 3A:
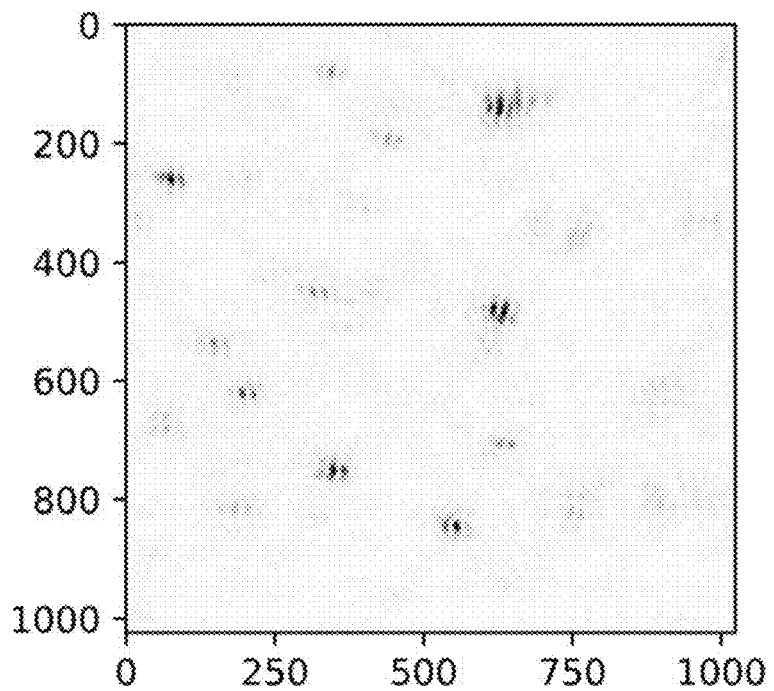
FIG. 3A to FIG. 3E are graphs explaining how to make a first pre-selection in the method of the present disclosure.

FIG. 3A is a greyscale depiction of the average values of the intensities of an image recorded by the image sensor 14 according to FIG. 1 over the first partial period of the set-up period, in which the sample 4 is moved with respect to the objective 2. This movement may, for example, be implemented such that the sample, within the x-/y-plane running orthogonally to the optical axis of the objective 2, is brought one after the other into one of 3×3 neighboring positions with respect to the objective 2. In each of these positions, the intensity of the light 29 from the sample 4 is registered. FIG. 3A shows the average values of the corresponding nine intensity values.

Figure 3B:
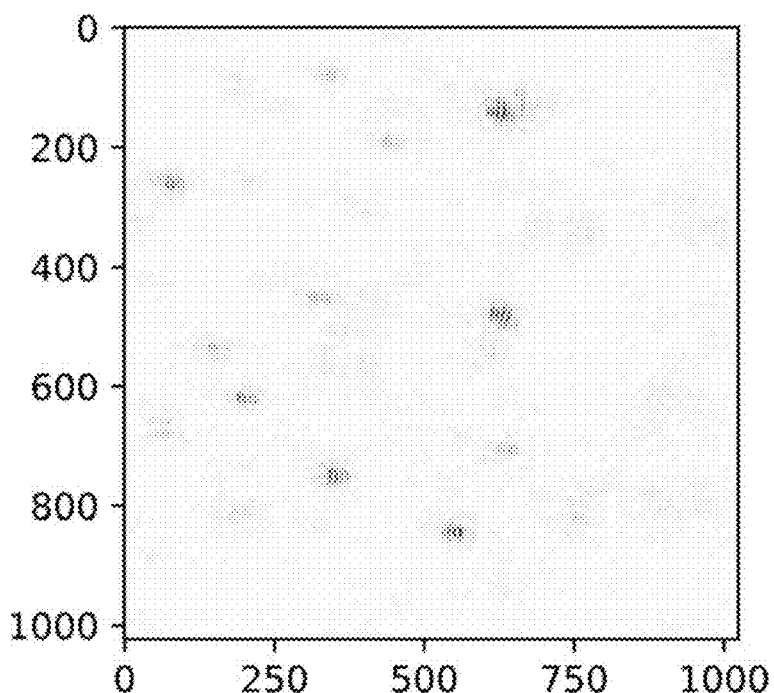
Figure 3C:
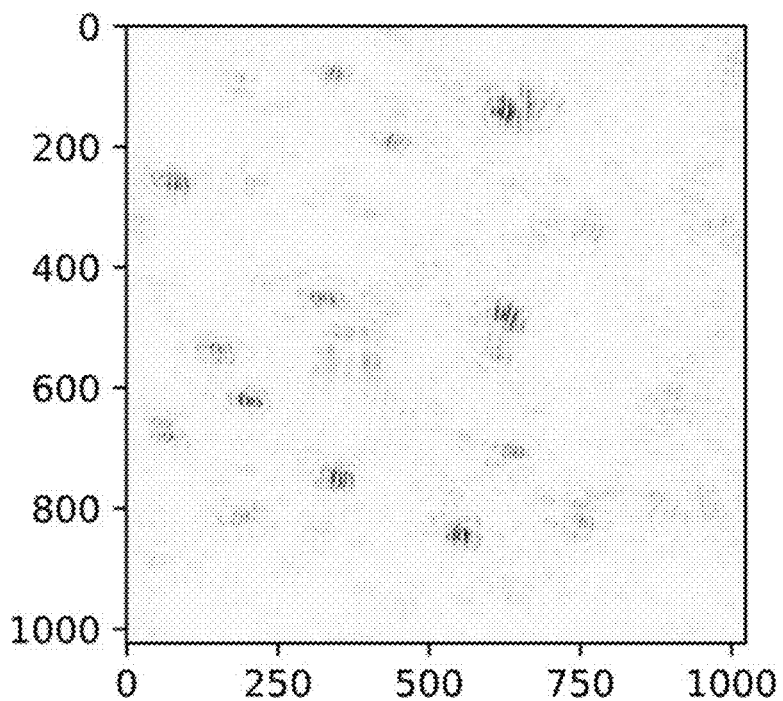
Figure 3D:
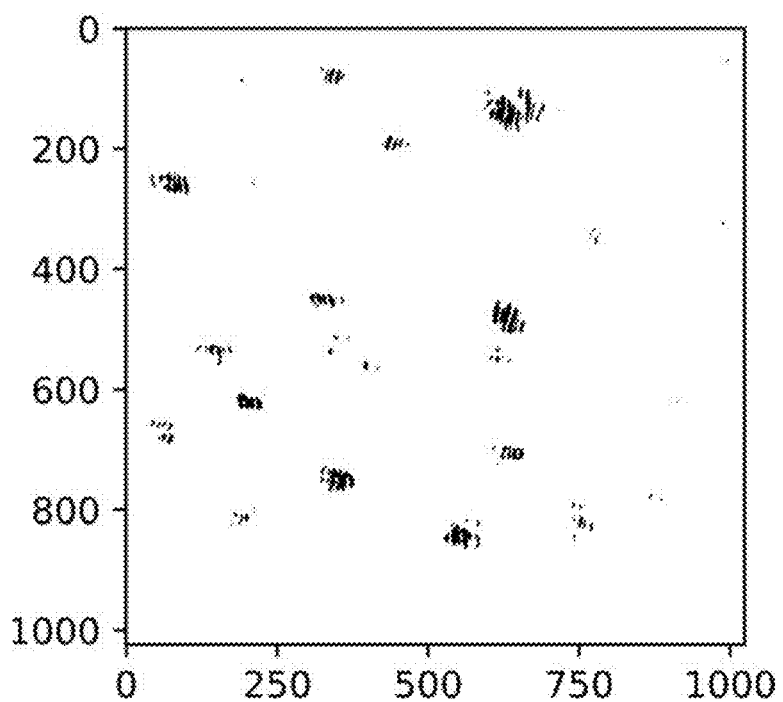
Figure 3E:
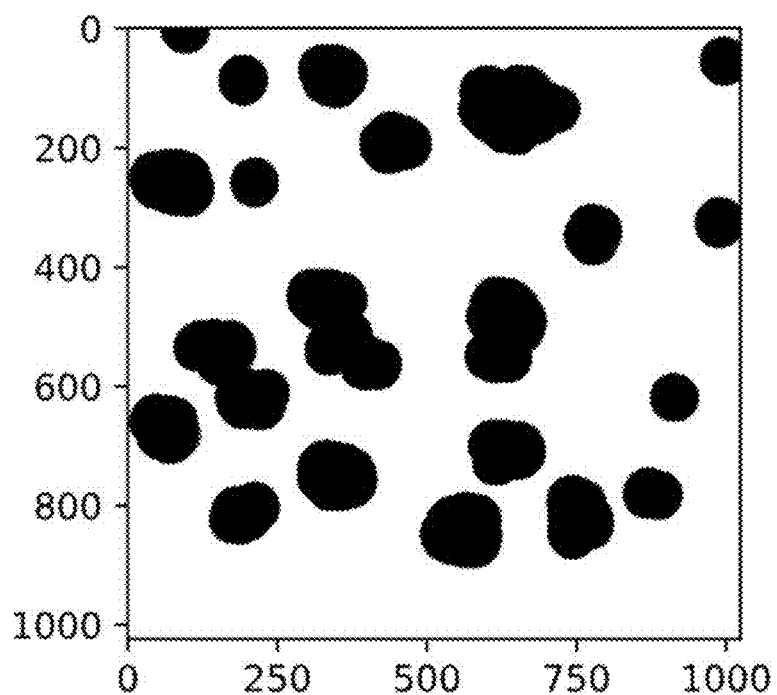

On the other hand, FIG. 3B is a greyscale depiction of the standard deviations of the intensities at the individual pixels of the image sensor 14. FIG. 3C is a greyscale depiction of the standard deviations according to FIG. 3B after their normalization as it will be explained in further detail below. FIG. 3D is the result of a comparison of the distribution of the normalized standard deviations according to FIG. 3C with a variation limit value whose determination will also be explained below. FIG. 3E shows the result, if all points within a predetermined maximum distance are added to each of the pixels exceeding the variation limit value according to FIG. 3D so that the object images of reference objects in the sample 4, which correspond to pixels above the variation limit value according to FIG. 3D, are still found on the image sensor 14 in one of the areas according to FIG. 3E even with a relative movement of the sample 4 with respect to the objective 2.

Whereas FIGS. 3A to 3E illustrate the determination of the first pre-selection according to the steps 31-33 according to FIG. 2 in more detail, FIGS. 4A-4E illustrate the determination of the third pre-selection according to the steps 38 and 39 in FIG. 2. Here, no movement of the sample 4 with respect to the objective 2 occurs. Variations of the intensity of the light 29 from the sample 4 resulting at the pixels of the image sensor 4 are thus completely due to statistical effects, movements of structures within the sample and faulty pixels of the image sensor 14.

Figure 4A:
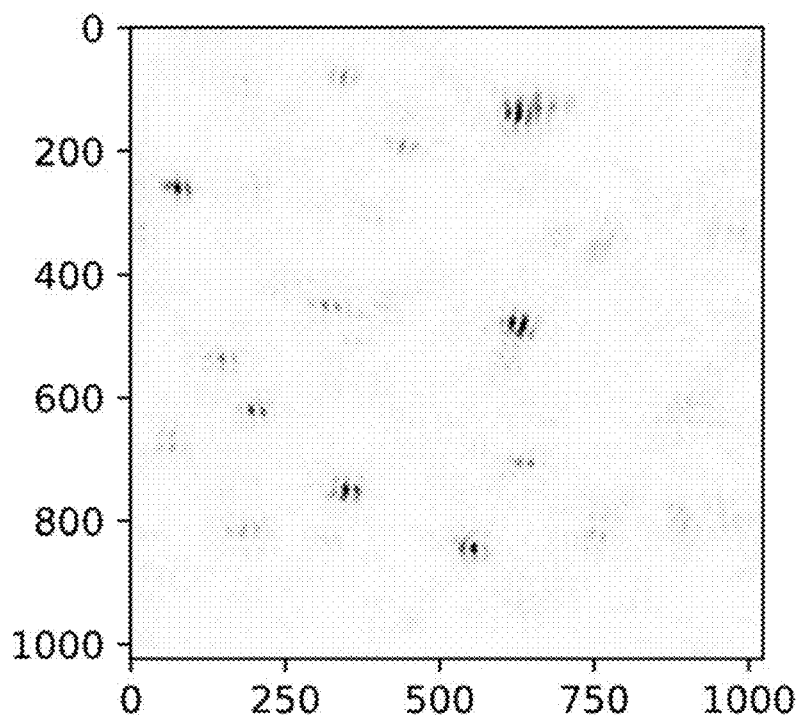
FIG. 4A to FIG. 4E are graphs explaining how to make a third pre-selection in the method of the present disclosure.
Figure 4B:
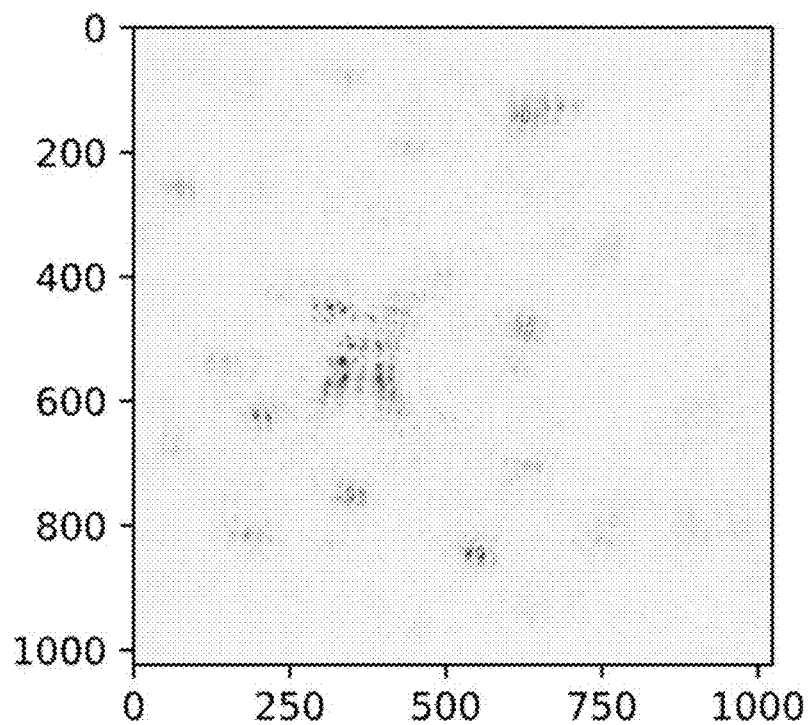
Figure 4C:
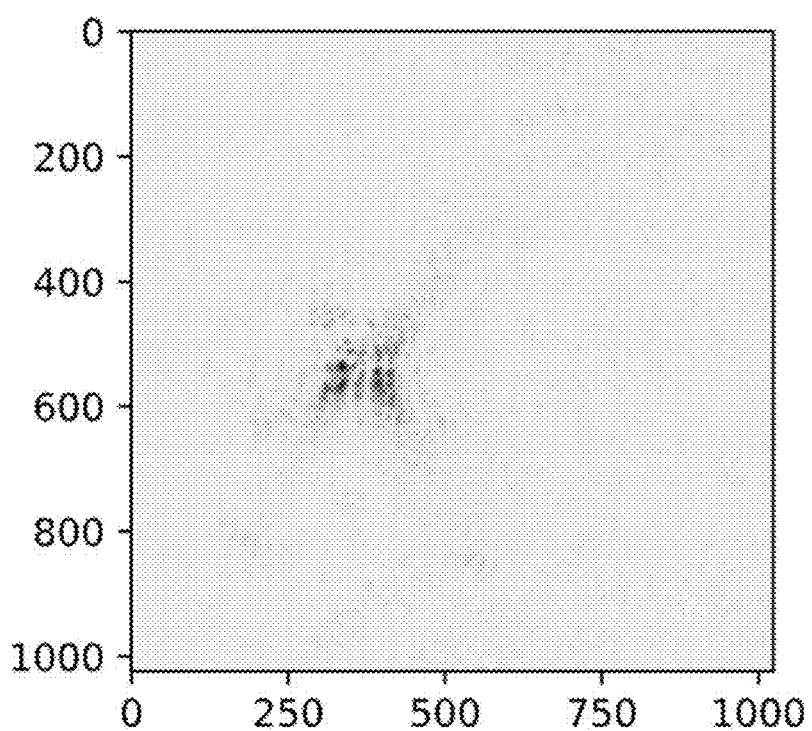
Figure 4D:
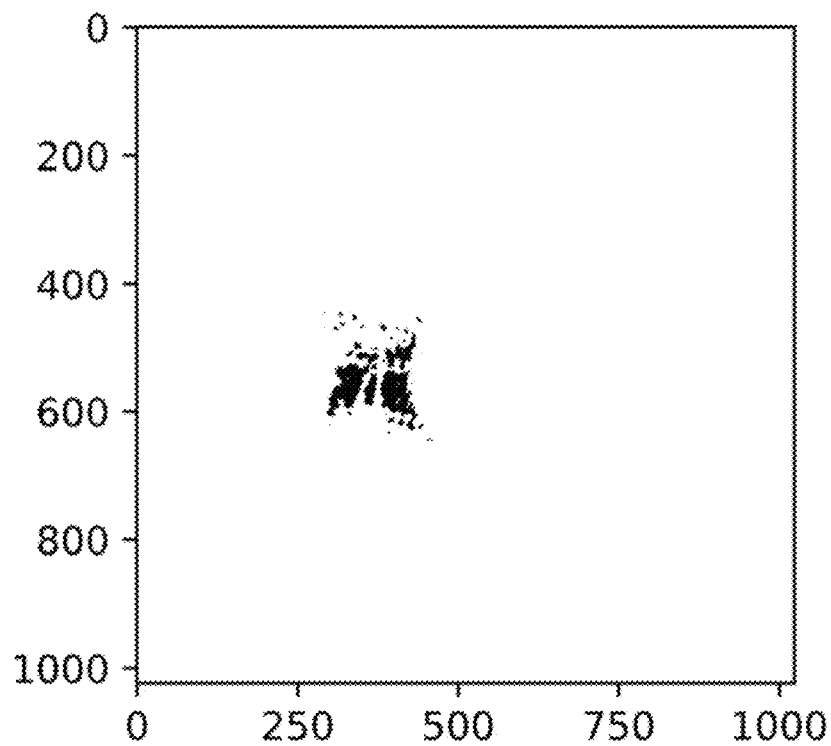
Figure 4E:
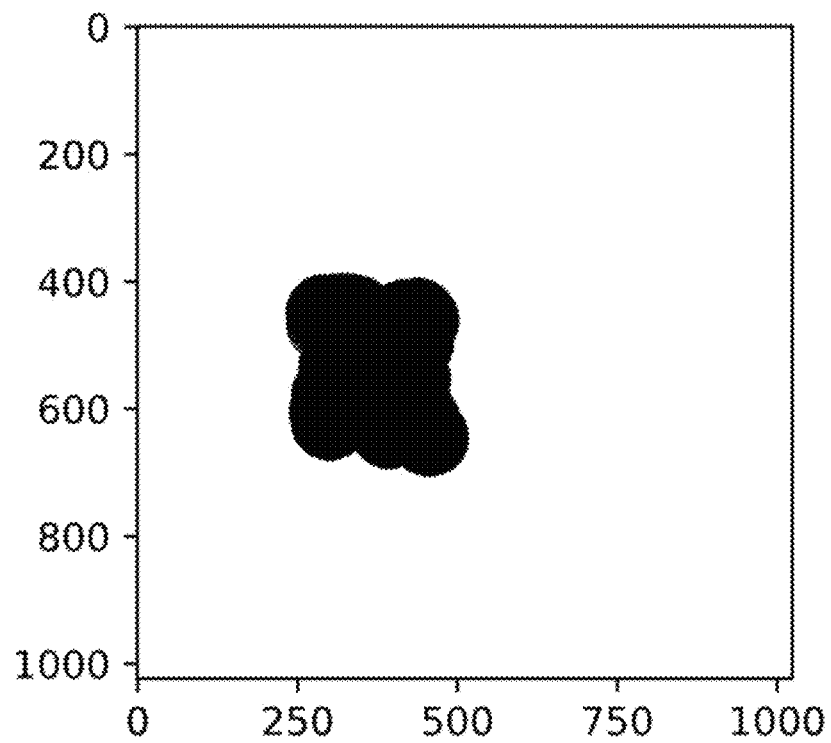

The distribution of the average intensities according to FIG. 4A does not noticeably differ from that one of the average intensities according to FIG. 3A. On the other hand, the distribution of the standard deviations of the variations according to FIG. 4B is very different to that one according to FIG. 3B. The differences of the distribution of the normalized standard deviations according to FIG. 4C to that one according to FIG. 3C and the result of the comparison of the normalized standard deviations with a third variation limit value according to FIG. 4D to the result of the comparison according to FIG. 3D are even higher. In FIG. 4E, the third pre-selection is depicted in such a way that the selected pixels are bright here, whereas the non-selected or deselected pixels are black. The depiction therefore differs from that one of the first pre-selection in FIG. 3E.

Figure 5A:
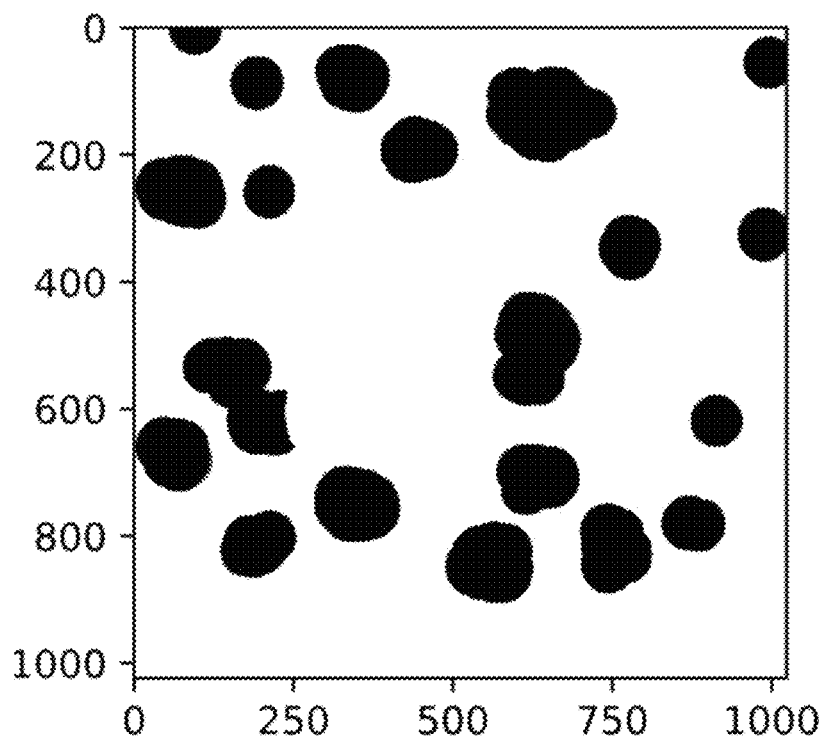
FIG. 5A, FIG. 5B and FIG. 5C are graphs explaining how to form an image mask in the method of the present disclosure.
Figure 5B:
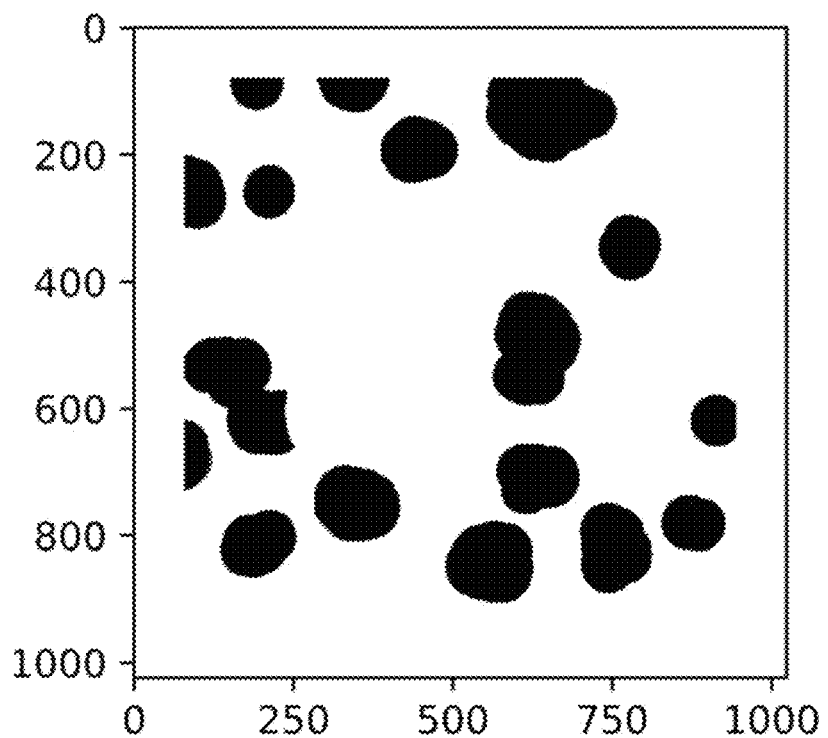
Figure 5C:
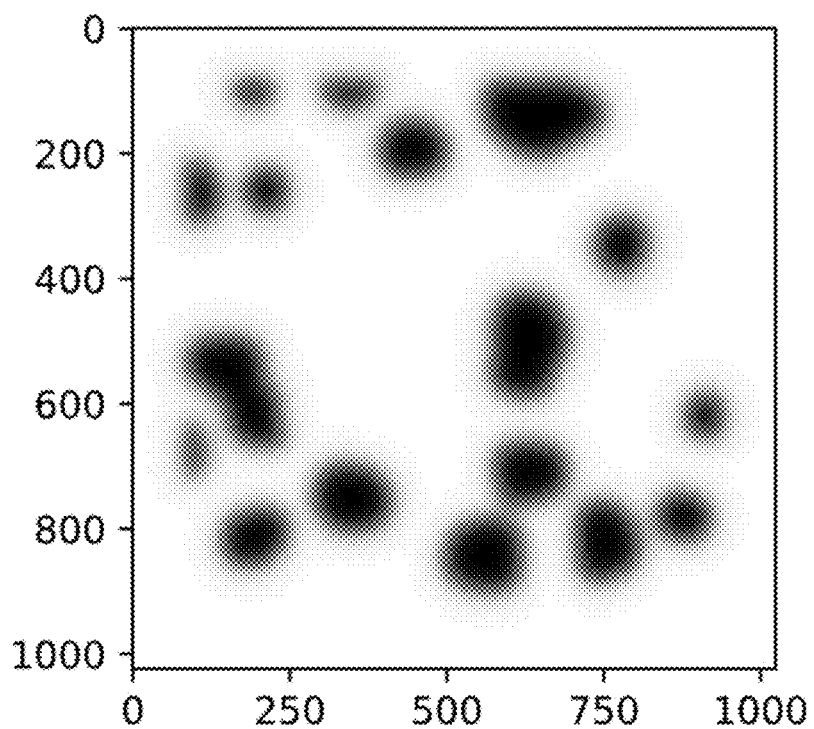

Thus, in the intersection of the first and the third pre-selection according to FIG. 5A the areas marked in black in FIG. 4E are missing as compared to the first pre-selection according to FIG. 3E. According to FIG. 5B, as taking place in the step 41 of FIG. 2, pixels at the margins of the image sensor 4 are additionally removed. According to FIG. 5C, as taking place in step 42 of FIG. 2, the edges of the subset of the pixels corresponding to FIG. 5B are smoothened. An image mask corresponding to FIG. 5C may then be used in step 43 of FIG. 2 in comparing the images to the reference images for detecting movements of the sample 4 with respect to the objective 2.

Figure 6A:
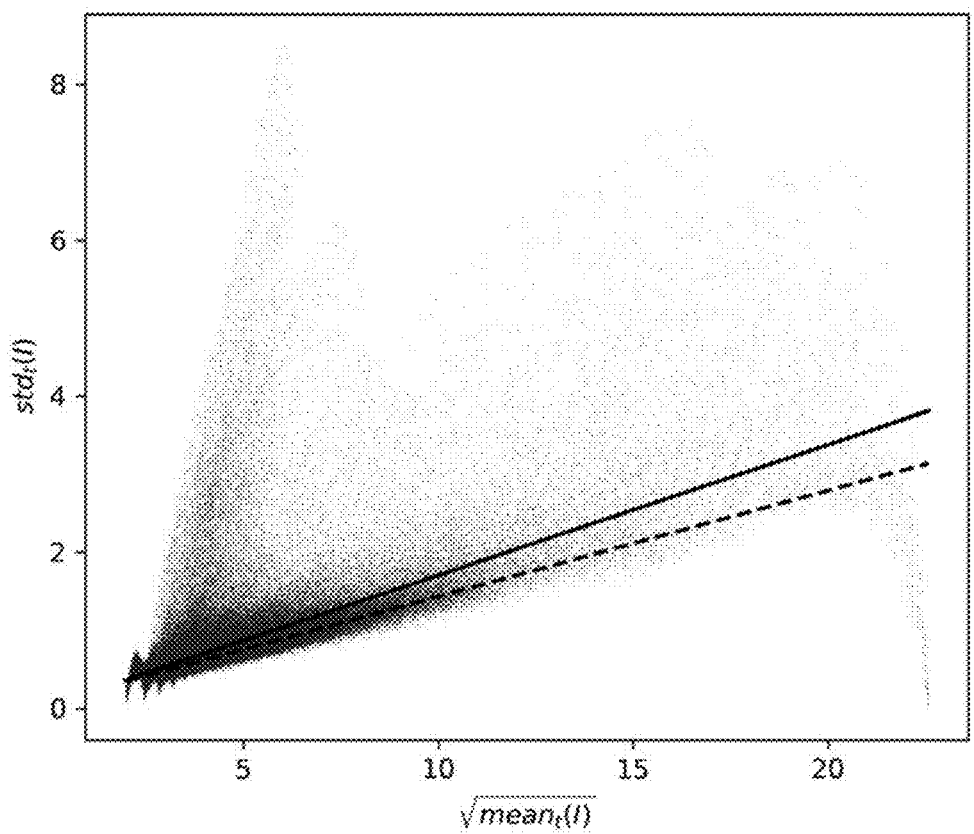
FIG. 6A, FIG. 6B and FIG. 6C are graphs showing details of the third pre-selection in the method of the present disclosure.
Figure 6B:
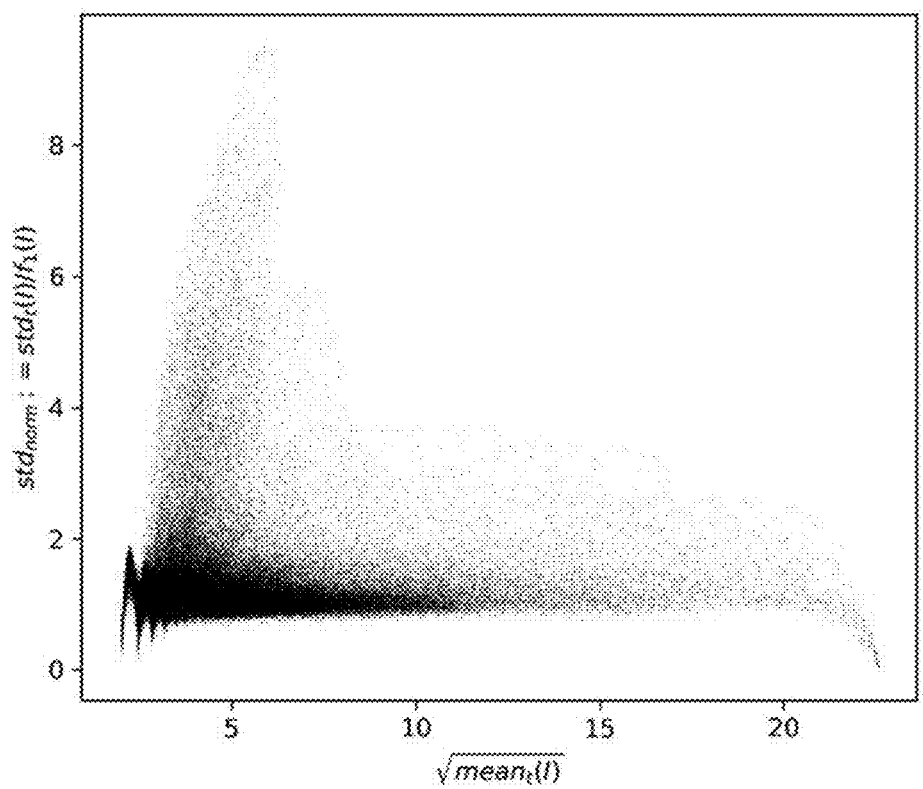
Figure 6C:
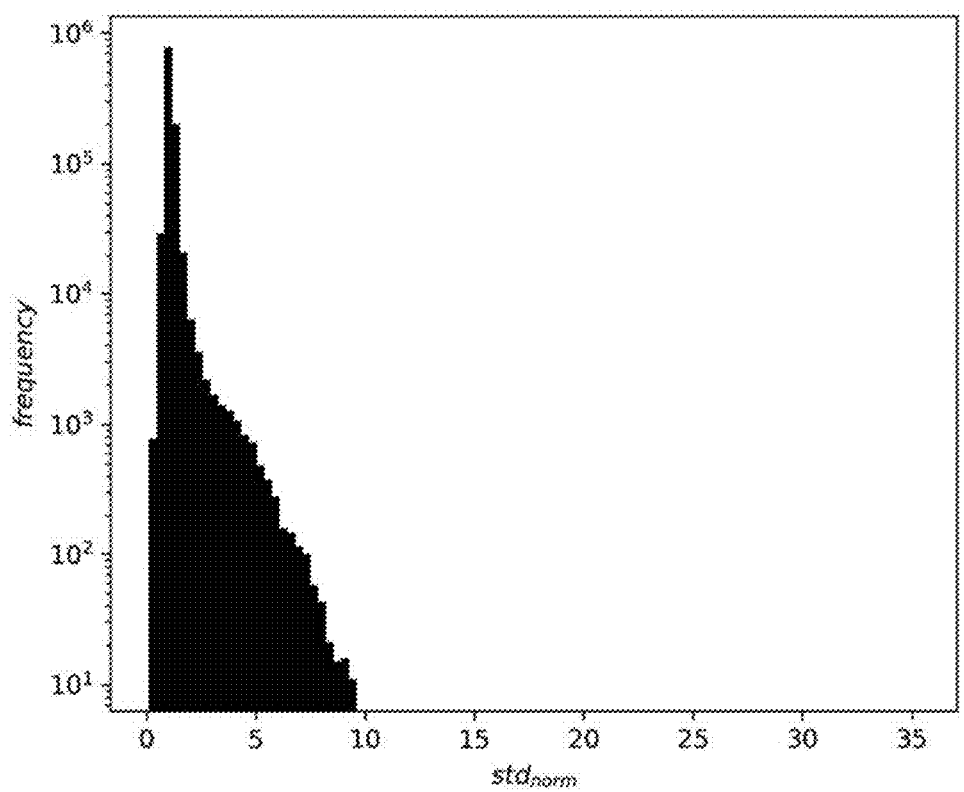

FIG. 6A is a plot of the standard deviations of the intensities of the light 29 from the sample 4 over the third partial period without movement of the sample, as they have been determined in step 38 of FIG. 2, over the respective average value of the intensities over the third partial period. In other words, for each average value of the intensities or the root thereof depicted in FIG. 4A in a greyscale, the associated standard deviation is plotted according to the greyscale in FIG. 4B. With a continuous line, FIG. 6A shows the result of a linear regression over all value pairs plotted. With a dashed line, the result of a further linear regression for all value pairs below the continuous line is depicted. Thus, the dashed line indicates a variation background value depending on the root extracted from the average intensity. FIG. 6B shows the value pairs according to FIG. 6A after normalizing of the respective standard deviation to the variation background value. This normalized standard deviations are depicted in FIG. 4C as greyscales. FIG. 6C is a histogram of the normalized standard deviations. Here, the frequency of the standard deviations in different size classes of the normalized standard deviation are plotted in an algorithmic way. By, for example, determining a 99% percentile, the variation limit value for determining the significant normalized variations, which depends on the respective sample, may be determined. However, the significant normalized variations shown in FIG. 4D are based on a variation limit value set to 3 based on common statistical significance criteria.

Figure 7A:
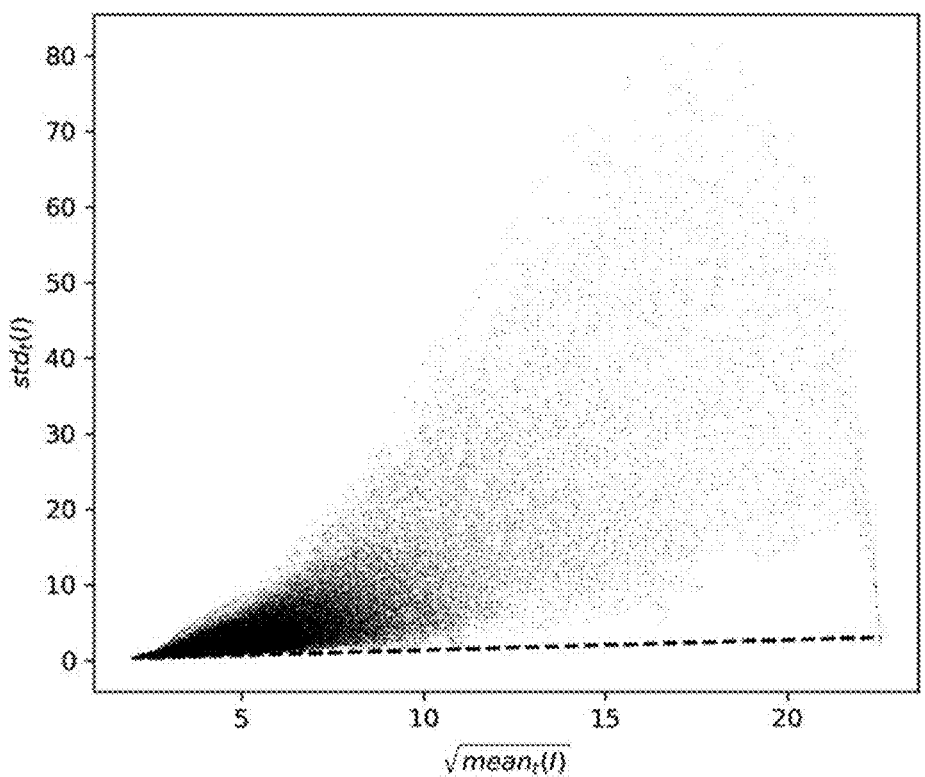
FIG. 7A, FIG. 7B and FIG. 7C show details of the first pre-selection in the method of the present disclosure.
Figure 7B:
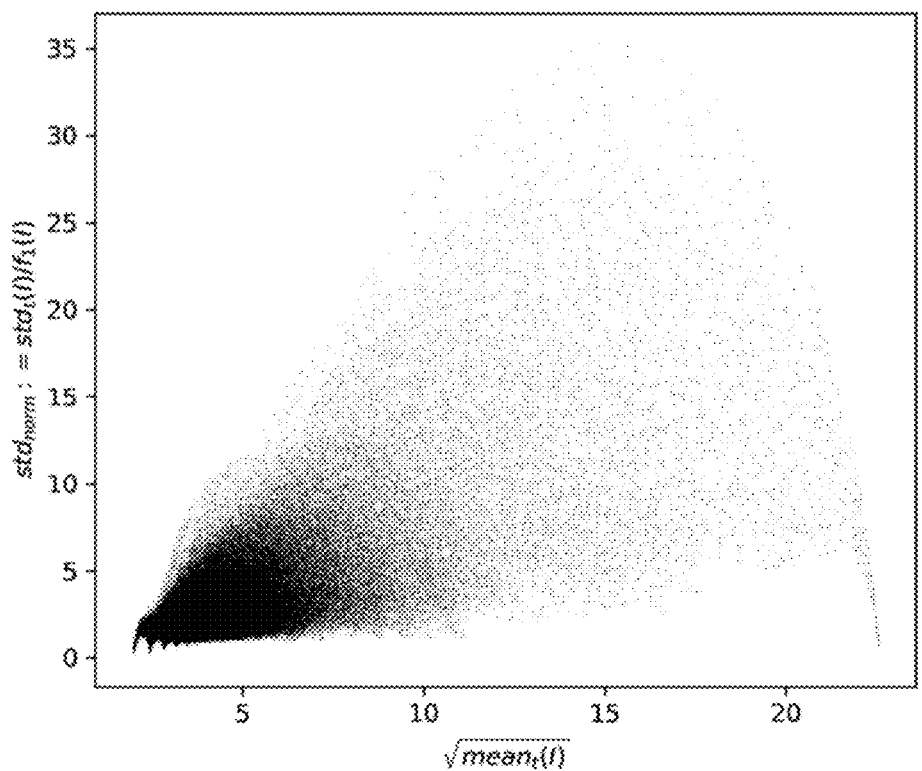
Figure 7C:
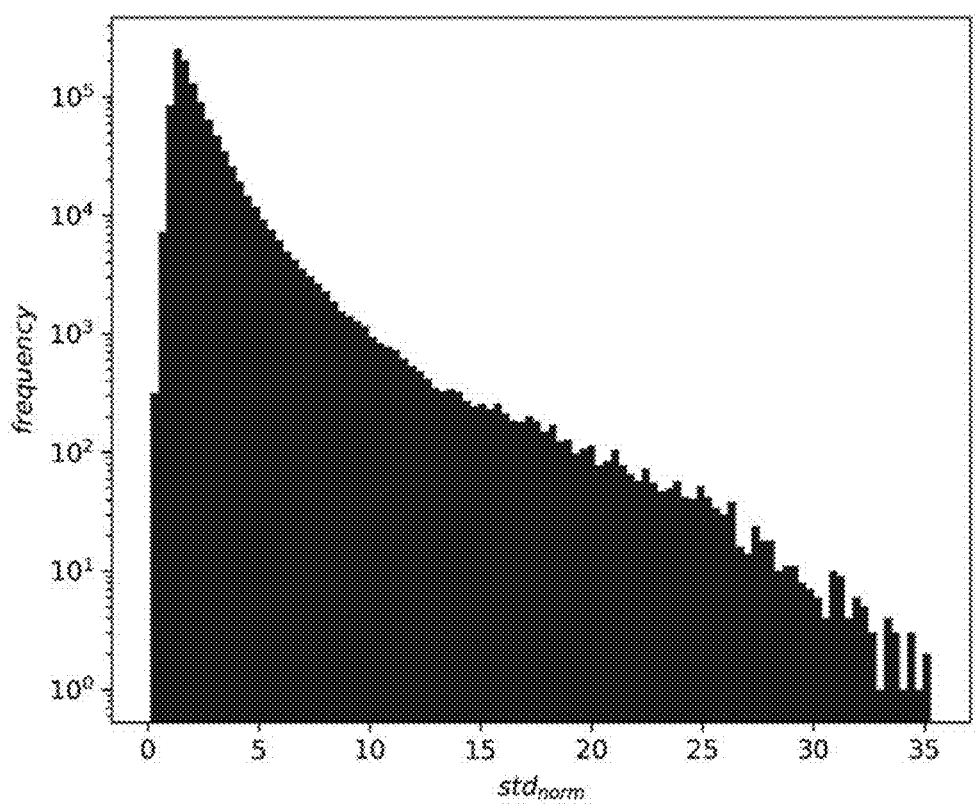

FIGS. 7A to 7C show the depictions of the first variations determined during the first partial period of the set-up period corresponding to FIGS. 6A-6C. However, no new variation background value which depends on the square root drawn from the average intensity is determined from FIG. 7A; instead that one according to FIG. 6A is used, i.e. the dashed line in FIG. 7A is the same one as in FIG. 6A. That the dashed line in FIG. 7A appears to have a smaller slope is due to the fact that the standard deviations of the intensities determined in the step 33 of FIG. 2 are, also relatively, clearly higher than those of the intensities determined in step 38 of FIG. 2. FIG. 7B shows the value pairs according to FIG. 7A after normalizing the respective standard deviation to the deviation background value according to FIG. 6A. These normalized standard deviations are depicted as greyscales in FIG. 5C. FIG. 7C is a histogram of the normalized standard deviations corresponding to FIG. 6C. Once again, by means of, for example, determining a 99% percentile, the variation limit value for determining the significant normalized variations, which depends on the respective sample, may be determined. However, the significant normalized variations depicted in FIG. 5D are based on a variation background value set to 10. This higher variation background value counts for the fact that the standard deviations of the intensities determined in the step 33 of FIG. 2 during moving the sample, even after their normalizing, are clearly higher than those of the intensities determined in the step 38 of FIG. 2 with the sample that is not moved.

If special reference objects, like for example gold nanorods, whose images are well suited for detecting movements of the sample 4 with respect to the objective 2 are included in the sample 4, the method of the present disclosure automatically selects the pixels belonging to the object images of these artificial reference objects. In this case, structures of the sample are only rarely and only then selected if they are similarly well suited as reference objects as the special reference objects. If, however, no special reference objects are introduced into the sample, the method of the present disclosure—at least when using the percentiles according to FIG. 7C—selects the structures of the sample that are best suited as reference objects. All that occurs completely automatically. If, however, the normalized standard deviations above the 99% percentile according to FIG. 7C, due to missing special reference objects and structures of the respective sample suitable as an alternative, are only small and does not significantly exceed the normalized standard deviations above the 99% percentile according to FIG. 6C, the method of the present disclosure—independently on any other use of the percentile according to FIG. 7C—may put out a warning message indicating that the respective sample is not well suited for detecting its movement with respect to the objective.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of detecting movements of a sample with respect to an objective, the method comprising
    imaging the sample onto an image sensor which comprises an array of pixels by means of the objective;
    in a set-up period
        registering light coming from the sample at the pixels of the image sensor;
        determining temporal variations of intensities of the light coming from the sample and registered at the individual pixels of the image sensor during the set-up period in that a temporal course of the intensity of the light, which has been registered at each respective one of the individual pixels of the image sensor over the set-up period, such that each pixel of the image sensor is analyzed separately;
        selecting a subset of not more than 90% of the pixels of the image sensor using the temporal variation of each of the pixels of the image sensor as a criterion;
    after the set-up period
        recording images of the sample by the image sensor in that light coming from the sample is registered at the pixels of the image sensor; and
        comparing parts of the images that each correspond to the selected subset of the pixels of the image sensor to parts of at least one reference image that also correspond to the subset of the pixels of the image sensor to detect undesired movements of the sample with respect to the objective.

2. The method of claim 1, wherein, in the step of determining, the variations are determined in that a standard deviation of the intensity of the light from an average intensity of the light, which has been registered at the respective pixel of the image sensor, is calculated.

3. The method of claim 1,
    wherein, in the step of determining, the sample, during a first partial period of the set-up period, is set in a first motion with respect to the objective, and first variations over the first partial period resulting from the first motion are determined, and
    wherein, in the step of selecting, the first variations are used as a positive criterion in selecting the subset of the pixels of the image sensor.

4. The method of claim 3, wherein, in the step of selecting, the subset of the pixels of the image sensor is selected such that the first variations exceed a first variation limit value at the pixels of the subset or within a predetermined maximum first distance to the pixels of the first subset.

5. The method of claim 4, wherein, in the step of selecting, a first pre-selection for the subset of the pixels is made in that all pixels are selected at which the first variations exceed the first variation limit value and in that all pixels are added which are located within the predetermined maximum first distance to the pixels at which the first variations exceed the first variation limit value.

6. The method of claim 5,
wherein, in the step of determining, the first motion runs in a first direction or plane in which the movements of the sample with respect to the objective are detected,
wherein, in the step of determining, the sample, during a second partial period of the set-up period, is set in a second motion with respect to the objective, that runs in a second direction in which the movements of the sample with respect to the objective are detected and which is normal to the first direction or plane, and second variations resulting from the second motion over the second partial period are determined, and
wherein, in the step of selecting, the second variations are used as a positive criterion in selecting the subset of the pixels of the image sensor.

7. The method of claim 6, wherein, in the step of selecting, the subset of the pixels of the image sensor is selected such that the second variations exceed a second variation limit value at the pixels of the subset or within a predetermined maximum second distance to the pixels of the subset.

8. The method of claim 7, wherein, in the step of selecting, a second pre-selection for the subset of the pixels is made in that all pixels are selected at which the second variations exceed the second variation limit value and in that all pixels are added which are located within the predetermined maximum second distance to the pixels at which the second variations exceed the second variation limit value.

9. The method of claim 8, wherein, in the step of selecting, a unified pre-selection for the subset of the pixels is made in that a union of the first pre-selection and the second pre-selection is determined.

10. The method of claim 1,
wherein, in the step of determining, the sample, during a third partial period of the set-up period, is not moved with respect to the objective, and third variations occurring over the third partial period are determined, and
wherein, in the step of selecting, the third variations are used as a negative criterion in selecting the subset of the pixels of the image sensor.

11. The method of claim 10, wherein, in the step of selecting, the subset of the pixels of the image sensor is selected such that the third variations do not exceed a third variation limit value at the pixels of the subset or within a predetermined maximum third distance to the pixels of the subset.

12. The method of claim 11, wherein, in the step of selecting, a third pre-selection for the subset of the pixels is made in that all pixels are removed at which the third variations exceed the third variation limit value and in that further all pixels are removed which are within the predetermined maximum third distance to the pixels at which the third variations exceed the third variation limit value.

13. The method of claim 12, wherein, in the step of selecting, a cut-set of the third pre-selection and the first or unified pre-selection is determined in selecting the subset of the pixels of the image sensor.

14. The method of claim 10, wherein, in the step of selecting, the third variations are used as a negative criterion in selecting the subset of the pixels of the image sensor in that an pixel weighting mask is applied to the images and the at least one reference image, whose transparency decreases with increasing third variation at the respective pixel.

15. The method of claim 1, wherein, in the step of determining, the variations are adjusted with regard to at least one of
a background noise at the pixels of the image sensor in that from each variation a constant background noise value is subtracted, and
a statistically caused variation background depending on a square root of an average intensity of the light registered at the respective pixel of the image sensor, in that
the variation background value at the respective pixel is subtracted from each variation or each variation is divided by the variation background value at the respective pixel.

16. The method of claim 1, wherein, in the step of selecting, pixels which do not keep a fourth distance to a margin of the image sensor are not considered or removed.

17. The method of claim 1, wherein, in the step of comparing, an image mask is applied to the images and the at least one reference image, that implements the selection of the subset of the pixels of the image sensor by transparent regions.

18. The method of claim 17, wherein edges between the transparent regions and non-transparent regions of the image mask are smoothened prior to applying the image mask.

19. The method of claim 1, wherein, in the step of selecting, the subset is selected such as to not include more than 75% or 50% or 25% of the pixels of the image sensor.

20. A microscope comprising
an objective,
a sample holder for positioning a sample relative to the objective, and
a device for detecting movements of the sample with respect to the objective, wherein the device comprises
an image sensor including an array of pixels, onto which the sample is imaged by means of the objective, the image sensor being configured for recording images of the sample in that light coming from the sample is registered at the pixels of the image sensor,
a selection module configured
to automatically determine temporal variations of intensities of light coming from the sample and registered at the individual pixels of the image sensor during a set-up period in that a temporal course of the intensity of the light registered at each respective individual pixel of the image sensor over the set-up period such that each pixel of the image sensor is analyzed separately, and
to automatically use the temporal variation of each of the pixels of the image sensor as a criterion in selecting a subset of not more than 90% of the pixels of the image sensor, and
a comparison module configured to compare parts of the images which each correspond to the subset of the pixels of the image sensor with parts of at least one reference image which also correspond to the subset of the pixels of the image sensor to detect undesired movements of the sample with respect to the objective.

21. The method of claim 1, wherein the step of selecting a subset of not more than 90% of the pixels of the image sensor comprises setting the sample in motion with respect to the objective in the set-up period, and wherein the highest temporal variations due to the motion of the sample are the criterion in selecting the subset of the pixels of the image sensor.

22. The method of claim 21, wherein the highest temporal variations point to portions of the at least one reference image that also correspond to the subset of the pixels of the image sensor which, due to the motion of the sample with respect to the objective, move in a determinable way so that the movements of the sample with respect to the objective can be tracked by determinable changes of the images.

23. The method of claim 21, wherein pixels at which, despite the motion of the sample with respect to the objective, no remarkable temporal variations occur are not in the selected subset because the pixels are without information content for tracking the movements of the sample with respect to the objective.

24. The method of claim 21, wherein the step of selecting a subset of not more than 90% of the pixels of the image sensor further comprises not moving the sample with respect to the objective in the set-up period, and wherein pixels at which, despite no moving the sample with respect to the objective, remarkable temporal variations occur are not in the selected subset because the pixels are without information content for tracking the movements of the sample with respect to the objective.

\* \* \* \* \*